US007664629B2

(12) United States Patent
Dymetman et al.

(10) Patent No.: US 7,664,629 B2
(45) Date of Patent: Feb. 16, 2010

(54) SECOND LANGUAGE WRITING ADVISOR

(75) Inventors: Marc Dymetman, Grenoble (FR); Pierre Isabelle, Gatineau (CA)

(73) Assignee: Xerox Corporation, Norwalk, CT (US)

( * ) Notice: Subject to any disclaimer, the term of this patent is extended or adjusted under 35 U.S.C. 154(b) by 726 days.

(21) Appl. No.: 11/184,477

(22) Filed: Jul. 19, 2005

(65) Prior Publication Data

US 2007/0033002 A1 Feb. 8, 2007

(51) Int. Cl.
*G06F 17/28* (2006.01)

(52) U.S. Cl. ............................... 704/4; 704/2

(58) Field of Classification Search ...... 704/2, 704/8
See application file for complete search history.

(56) References Cited

U.S. PATENT DOCUMENTS

| 4,674,065 | A | | 6/1987 | Lange et al. | |
|---|---|---|---|---|---|
| 4,868,750 | A | | 9/1989 | Kucera et al. | |
| 5,258,909 | A | | 11/1993 | Damerau et al. | |
| 5,477,450 | A | * | 12/1995 | Takeda et al. | 704/2 |
| 5,659,771 | A | * | 8/1997 | Golding | 715/257 |
| 7,035,788 | B1 | * | 4/2006 | Nakajima et al. | 704/9 |
| 7,107,204 | B1 | * | 9/2006 | Liu et al. | 704/2 |
| 7,149,970 | B1 | * | 12/2006 | Pratley et al. | 715/257 |
| 7,200,550 | B2 | * | 4/2007 | Menezes et al. | 704/10 |
| 2002/0111789 | A1 | * | 8/2002 | Hull | 704/4 |
| 2003/0149686 | A1 | * | 8/2003 | Drissi et al. | 707/3 |
| 2004/0059730 | A1 | * | 3/2004 | Zhou | 707/4 |
| 2004/0078204 | A1 | | 4/2004 | Segond et al. | |
| 2005/0021323 | A1 | * | 1/2005 | Li | 704/5 |
| 2007/0208569 | A1 | * | 9/2007 | Subramanian et al. | 704/270 |

FOREIGN PATENT DOCUMENTS

GB 2388940 A 11/2003

OTHER PUBLICATIONS

U.S. Appl. No. 11/018,758, filed Dec. 21, 2004, Brun, et al.
Banko, et al. "Scaling to Very Very Large Corpora For Natural Language Disambuguation", Proceedings of ACL 2001.
Bellegarda, "Exploiting Latent Semantic Information in Statistical Language Modeling", Proceedings of IEEE, 88(8):1279-1296, Aug. 2000.
Brill, et al. "An Improved Error Model for Noisy Channel Spelling Correction", Proceedings of ACL 2001.

(Continued)

*Primary Examiner*—Talivaldis Ivars Smits
*Assistant Examiner*—Samuel G Neway
(74) *Attorney, Agent, or Firm*—Fay Sharpe LLP

(57) ABSTRACT

A writing advisor program (20) receives a proposed text in an author's second language (L2) and determines at least one candidate replacement word for a selected word based on a determined language model (p(c)) and a determined corruption model (p(r|c)). The determined language model reflects correct usage of the text in the second language, independent of the native or first language (L1) of the author, based on (L2) corpora. The determined corruption model is based on some a priori knowledge about probable corruption paths leading the author to realize some inadequate expression in the second language instead of the correct, intended expression. Different types of corruption paths may be used that include bidirectional translations, false-friends, synonyms, common semantic features, second language internal cognates, preposition alternatives, and first language inserts.

16 Claims, 3 Drawing Sheets

OTHER PUBLICATIONS

Berger, et al. "A Maximum Entropy Approach to Natural Language Processing", Computational Linguistics, 22(1):39-71, 1996.

Brown, et al. "The Mathematics of Statistical Machine Translation: Parameter Estimation", Computational Linguistics, 19(2):263-311, 1993.

Cussens, "Integrating Probabilistic and Logical Reasoning", Electronic Transactions on Artificial Intelligence, 1999.

International Corpus of Learner English.

IMA Workshop "Mathematical Foundations of Natural Language Modeling", 2000.

Kernighan, et al. "A Spelling Correction Program Based on a Noisy Channel Model", Proceedings of COLING-90.

Kersting, et al. "Bayesian Logic Programs", Cussens, et al. Eds. ILP00WIP, pp. 138-155 (2000).

Kindt, et al. "Integrating Language Learning and Teaching with the Construction of Computer Learner Corpora" Academia: Literature and Language, 2001.

McCoy, et al., "English Error Correction: A Syntactic User Model Based on Principled 'Mal-Rule' Scoring", Proceedings of UM-96, Fifth Int'l Conference on User Modeling, Kailua-Kona, Hawaii, Jan. 1996, pp. 59-66.

Manning, et al. "Foundations of Statistical Natural Language Processing", MIT Press, 1999.

Och, "Statistical Machine Translation: From Single-Word Models to Alignment Templates", PhD Thesis, RWTH Aachen, Jun. 2003.

Park, et al., "An English Grammar Checker As a Writing Aid for Students of English as a Second Language", Proceedings of ACL Applied NLP Conference, 1997.

Rosenfeld, "Two Decades of Statistical Language Modeling: Where Do We Go From Here?", Proceedings of IEEE, 88(8), 2000.

http://www.softwareforstudents.com/.

http://www.auralog.com/fr/tellmemore_6.html.

Vennekens, et al., "General View on Probabilistic Logic Programming", In BNAIC, 2003.

\* cited by examiner

| | | |
|---|---|---|
| 1 | $s_{injured} \rightarrow id_{injured}$ | $[\alpha]$ |
| 2 | $s_{injured} \rightarrow efe_{injured}$ | $[1-\alpha]$ |
| 3 | $id_{injured} \rightarrow prod_{injured}$ | $[1]$ |
| 4 | $efe_{injured} \rightarrow fe_{blessé}$ | $[1]$ |
| 5 | $s_{hurt} \rightarrow id_{hurt}$ | $[\alpha]$ |
| 6 | $s_{hurt} \rightarrow efe_{hurt}$ | $[1-\alpha]$ |
| 7 | $id_{hurt} \rightarrow prod_{hurt}$ | $[1]$ |
| 8 | $efe_{hurt} \rightarrow fe_{blessé}$ | $[1]$ |
| 9 | $s_{wounded} \rightarrow id_{wounded}$ | $[\alpha]$ |
| 10 | $s_{wounded} \rightarrow efe_{wounded}$ | $[1-\alpha]$ |
| 11 | $id_{wounded} \rightarrow prod_{wounded}$ | $[1]$ |
| 12 | $efe_{wounded} \rightarrow fe_{blessé}$ | $[1]$ |
| 13 | $fe_{blessé} \rightarrow fet_{blessé}$ | $\beta$ |
| 14 | $fe_{blessé} \rightarrow fec_{blessé}$ | $[1-\beta]$ |
| 15 | $fet_{blessé} \rightarrow prod_{hurt}$ | $[0.33]$ |
| 16 | $fet_{blessé} \rightarrow prod_{injured}$ | $[0.33]$ |
| 17 | $fet_{blessé} \rightarrow prod_{wounded}$ | $[0.33]$ |
| 18 | $fec_{blessé} \rightarrow prod_{blessed}$ | $[1]$ |
| 19 | $prod_{hurt} \rightarrow$ *hurt* | $[\gamma_{hurt}]$ |
| 20 | $prod_{hurt} \rightarrow$ *fail* | $[1-\gamma_{hurt}]$ |
| 21 | $prod_{injured} \rightarrow$ *injured* | $[\gamma_{injured}]$ |
| 22 | $prod_{injured} \rightarrow$ *fail* | $[1-\gamma_{injured}]$ |
| 23 | $prod_{wounded} \rightarrow$ *wounded* | $[\gamma_{wounded}]$ |
| 24 | $prod_{wounded} \rightarrow$ *fail* | $[1-\gamma_{wounded}]$ |
| 25 | $prod_{blessed} \rightarrow$ *blessed* | $[\gamma_{blessed}]$ |
| 26 | $prod_{blessed} \rightarrow$ *fail* | $[1-\gamma_{blessed}]$ |

*FIG. 3*

SECOND LANGUAGE WRITING ADVISOR

BACKGROUND

The present application relates to the text correction and translation arts. It finds particular application in conjunction with a system for advising a non-native speaker of more appropriate or idiomatic second language word choices.

There are various types of automatic text correction programs. For example, spelling correction programs compare each word of written text with a dictionary and identify the words which are not found in the dictionary. More sophisticated programs further recommend correctly spelled words which the writer can select as a substitute.

There are also grammar correction programs available which identify sentences or sentence portions which do not use proper grammar, for example, a mismatch between the subject and verb. Using a combination of spelling and grammar checking techniques, some programs also discriminate between predetermined sets of confusable words, such as to, too, and two.

Although these programs are effective for identifying spelling and grammar errors, they are not effective for identifying awkward word choices or words which are used out of normal context. For example, if the author wrote the sentence "he was wounded in a car accident", there is no identifiable spelling or grammatical error. Yet, "wounded" which in English normally connotes an injury inflicted by a weapon is a poor or naïve word choice. The present application contemplates an automated routine for identifying poor or naïve word choices.

Poor or naïve word choices are particularly problematic for non-native speakers who have a good vocabulary in their native language, but a limited command of vocabulary in their second language. However, even native speakers often have vocabulary limitations and can have errors with poor or naïve word choices.

For teaching a second language, programs are available which test the student on making the best word choice among apparent synonyms based on context. Typically, these programs are in the form of an exercise sheet in which the student is asked to fill in the blank in preselected sentences with a most appropriate word from preselected lists of similar meaning words. The sentences, lists, and correct choices are determined in advance by native speakers, typically language specialists. These and various other course work programs are effective for improving a student's vocabulary in a second language and improving the student's understanding of the appropriate context in which various word choices should be used. However, life is not limited to the examples in the text book. In preparing original writings in a second language, an author will often make naïve word choices, which, while not incorrect, can be embarrassing.

The present application overcomes the above-referenced problems and others.

BRIEF DESCRIPTION

In accordance with one aspect, a method of advising second language authors is provided. A proposed text in the author's second language is received. For at least a selected word in the second language text, a language model and a corruption model are determined. At least one substitute second language candidate word is proposed based on the language model and the corruption model to improve the second language text.

In accordance with another aspect, a word processing system includes a keyboard through which the text is entered, a monitor which displays text, a word processing program which retrieves keyboard entries and converts them into appropriate format for display on the monitor. A language advisor program is programmed to perform the method of the preceding paragraph.

In accordance with another aspect, an apparatus for advising second language authors is provided. A means receives the proposed text in the author's second language. Another means determines a language model and a corruption model for at least a selected word of the second language text. A means proposes at least one substitute second language word based on the language model and the corruption model to improve the second language text.

In accordance with another aspect, a word processing system is provided for advising authors. Text is entered by the author through a keyboard. A monitor displays text. A computer includes a word processing program and a writing advisor program. The word processing program converts entered text into appropriate format for display on the monitor. The writing advisor program determines at least one candidate replacement word for a selected word of the entered text based on a determined language model and a determined corruption model.

One advantage resides in providing an author with a menu of the selected improved word or phrase choices.

Another advantage resides in automatically advising an author when a word or phrase is used out of context.

Another advantage resides in enabling authors to write like a native speaker in a second language.

Another advantage resides in enabling authors to optimize word selection.

Still further advantages will be appreciated to those of ordinary skill in the art upon reading and understanding the following detailed description.

BRIEF DESCRIPTION OF THE DRAWINGS

The drawings are only for purposes of illustrating the exemplary embodiments and are not to be construed as limiting.

FIG. 3 illustrates an implementation of the corruption process through a probabilistic context-free grammar.

DETAILED DESCRIPTION

Figure 1:
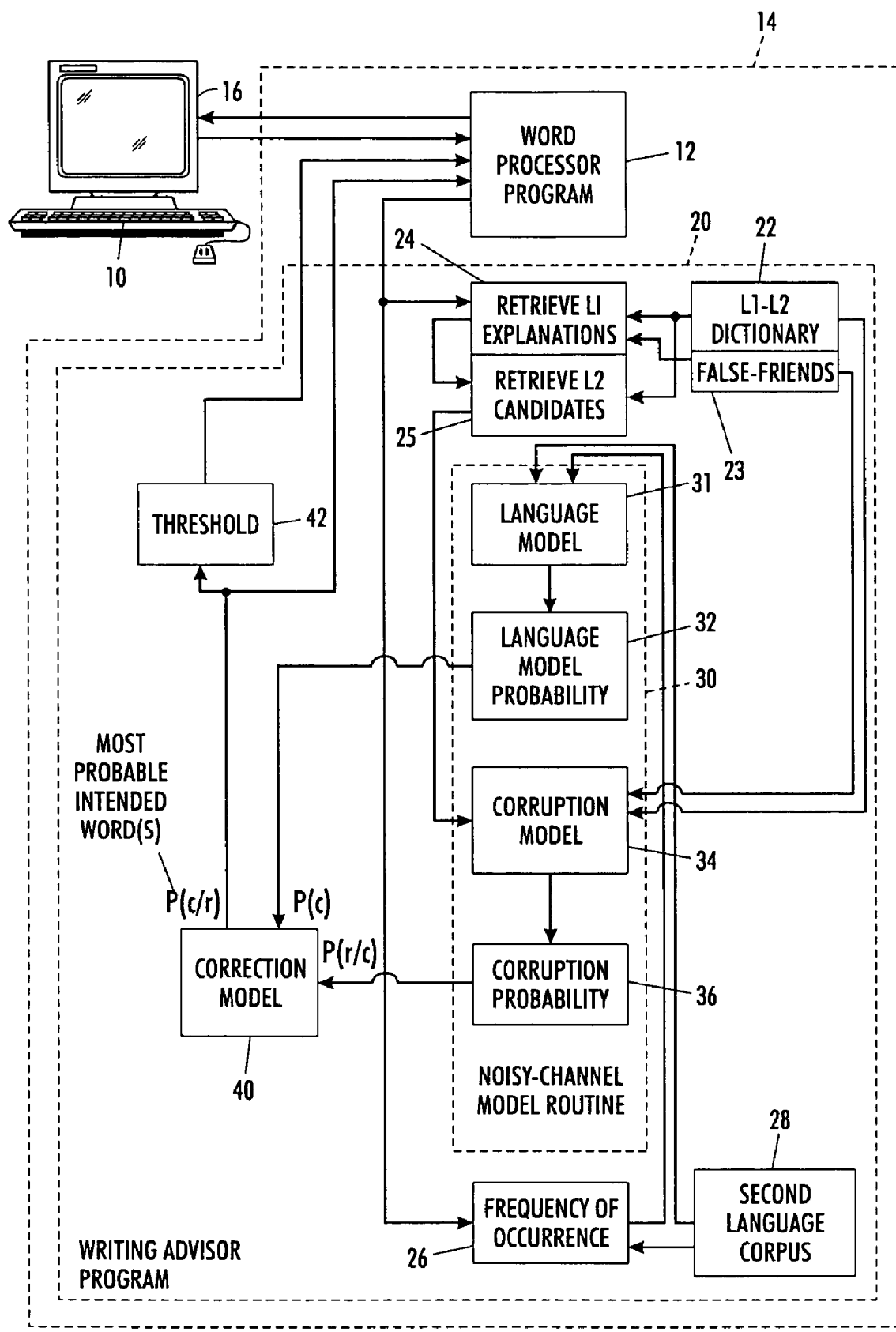
FIG. 1 illustrates a second language authoring system.

Although equally amenable to automated and manual operation, a manual implementation is described first for simplicity of illustration. With reference to FIG. 1, an author or operator whose native language is L1, e.g., French, uses a keyboard 10 and a computer word processing program or system 12 in a computer 14 to author a text in a second language L2, e.g., English. The L2 language text is displayed on an appropriate display, such as a monitor 16. The author enters, for example, the sentence "He was wounded in a car accident". In the present manual example, the author is unsure if "wounded" is the best word choice in language L2.

The author calls upon a second language writing advisor routine 20 in the computer 14. The writing advisor program (or routine) 20 includes an L1-L2 dictionary 22, French/English dictionary in the illustrative embodiment. The language advisor routine 20 first employs a subroutine 24 to consult the L1-L2 dictionary 22 in order to determine which French word could express a concept that the author would realize, correctly or incorrectly, as the English word "wounded". One such French word is found, namely "blessé", of which the correct English translation is sometimes, but not always (depending on context), the word "wounded".

In another embodiment, other resources than an L1-L2 dictionary, such as a "false-friend" list 23, can be used for determining which French word expresses the author's intended concept. For instance in the hypothetical case that the word used in the English text had been "blessed" (and not "wounded", as in the actual situation described), then the French word "blessé", which is similar in form, but not in meaning (a false-friend, also called cognate), could have been the French word that expressed the meaning that the author wanted to express, although he incorrectly chose "blessed" to express it, resulting in a mistake that needs to be corrected.

At this point (coming back to our actual example) having determined that "blessé" is a possible "explanation" for the presence of "wounded", the routine 20 calls an other subroutine 25 which again uses the L1-L2 dictionary, but this time in order to determine what could be acceptable translations of "blessé" in English, including such translations as "wounded", "hurt", or "injured".

Second, the second language writing advisor program 20 includes a language model routine 31 which performs a common usage check from a second language corpus 28. More specifically, the language model routine 31, in the present example, uses frequency of occurrence data output from routine 26 that searches the second language corpus 28 for "He was _____ in a car accident". Using a query on the corpus 28 of English texts available on the web (using a query engine such as Google®) as the basis on which the language model is built by routine 31, Table I illustrates the distribution and relative usage of words that could be used in this sentence. Other second language corpora are also contemplated. For example, if the author wants a text appropriate for modern colloquial usage, the second language corpus 28 can be built from a collection of recent newspaper stories. If the author is preparing a more formal paper, the language model might be built on the basis of a corpus of technical papers. Numerous other language models which contain a wide variety of usage of language L2 are also contemplated.

TABLE I

| Candidates | Frequency of Occurrence |
| --- | --- |
| "He was killed in a car accident" | 2200 |
| "He was involved in a car accident" | 650 |
| "He was injured in a car accident" | 320 |
| "He was paralyzed in a car accident" | 63 |
| "He was maimed in a car accident" | 35 |
| "He was hurt in a car accident" | 20 |
| "He was wounded in a car accident" | 2 |

Looking at Table I, it will be seen that the most probable word for use in this sentence was "killed"; however this is not a likely replacement for "wounded". The second language writing advisor program 20 includes a noisy-channel model routine 30 which next performs a cross-check or corruption modeling step p(r|c), where r is the English word actually realized by the author (in our example, the word "wounded"), and c is the correct English word which should be used, which is one of the words appearing in Table I, but is still to be determined. More specifically, the noisy-channel model routine 30 includes a module 32 which determines the language model probability p(c) of each of the occurrences c from the frequency of occurrence determined by routine 26. Next, the routine 30 includes a routine 34 that performs a step of determining the corruption model p(r|c), for c any of the candidates appearing in Table I, which correspond to the different possible underlying intentions of the author. Specifically to the present example, the routine or step 34 first accesses the dictionary 22 to translate each of the terms developed in Table I from the second language, English, back into the author's first language, French, and second, retranslates the French words obtained in English, either correctly or incorrectly, on the basis of the dictionary 22 or on the basis of a false-friend list 23. A computer routine 36 determines the corruption probability p(r=wounded|c) of producing the realization "wounded" for each of the candidates c appearing in Table I.

A correction model routine 40 combines the probabilities 32 and 36 into a combined probability p(c|r) and determines the most probable intended word. In one embodiment, the author, through a command entered on keyboard 10, causes the word processing program 12 to display the list of alternative words from the language model routine 26 on the display 16 in order of probability as determined by the combined probability 38. In a more automated embodiment, a threshold routine 42 compares the probability of not only the selected word ("wounded") with the relative probability of other words developed in Table I, but also the probability of each typed word in the text with the combined probability of candidate replacements for each word developed in like manner. If the probability of error is more than a preselected threshold, then the threshold routine 42 causes the word processing routing to display the word in question highlighted or otherwise marked on display 16 along with candidate words in order by probability. In this manner, each keyword of an authored text is automatically checked for language appropriateness.

Another problem arises when translating in a specialized field, such as describing a chess game. The piece which is known in English as a "rook" is called a "tour" in French, which translates literally as "tower". Translating "tour" as "tower" in some contexts is an accurate translation. Even in chess, this translation has some value. Indeed, one familiar with chess who reads an English text describing one piece as a "tower" will probably be able to determine the author's intended meaning, but will flag the author as one with limited English abilities. To overcome this problem, the dictionary 22 may also include one or more context dictionary sections and a context determining routine, forming part of program 20, for scanning the text looking for clues as to the context or field of the writing. For example, by searching for words such as "pawn", "bishop", "knight", "king", "queen", etc., the context routine can determine that the presently reviewed writing should be viewed in the chess context. Similar specialized context dictionary sections and recognition routines may be provided for other fields, such as scientific writings, writings in specific scientific fields, sports, automotive, and the like.

In one embodiment, the word processor routine displays each of the probable candidate words in order of combined probability. The author then selects among the most probable words manually using the keyboard. In another embodiment, the word processor routine further displays the meaning of each candidate word in the first language of the author. Optionally, the word processor further displays the determined probabilities for each of the most probable candidate words. In an automated embodiment, each typed word of the text is checked in the above-described manner. Those which exceed the threshold of threshold routine 42 are flagged in the text as the author is typing as being probably misused words. The candidate replacement words are preferably displayed analogous to correctly spelled words in a spelling-checking routine of the word processing program.

Looking at the translation process in greater detail, the general correction model has the form:

$$p(c|r) \propto p(r|c)p(c) \qquad (1)$$

where c is the correct "intended" English text in language L2, following correct usage, and where r is the current imperfect "realization" of that text as written by the author in language L1. It is assumed that p(c), hereinafter the language model probability, is the probability associated with a language model for the second language L2; while p(r|c), hereinafter the corruption model, is a kind of corruption probability which models what the probability of the actual realization r given that what the author intended was really c. This is an example of a generic noisy-channel model such as used in speech recognition or statistical machine translation.

A large body of text 28 in language L2, such as a Google® search corpus, an archive of recent newspaper stories, a corpus of technical articles, or the like, is available and a language model p(c) is derivable from it by language model routine 31 through standard techniques (see, for example, the following publications which are incorporated herein by reference: "IMA Workshop", Mathematical Foundations of Natural Language Modeling, 2000; and R. Rosenfeld, "Two Decades Of Statistical Language Modeling: Where Do We Go From Here?", Proceedings of the IEEE, 88(8), 2000).

In the present technique, it is assumed that an adequate training corpus which includes a large number of uncorrected texts aligned with their corrections is not readily available. Rather, the present technique uses a model based on an a priori specification of typical corruptions. In one embodiment, the model is of the form:

$$p(r|c) = \Pi_i p(r_i|c_i) \qquad (2)$$

where i runs over the length of c and where each word $r_i$ of the realized text is produced by exactly one word $c_i$ of the intended text, all of these being independent. More complex models are of course contemplated.

The model for corruption assumes that the author has a certain intention which, if he were a perfect English-speaker, he would realize as the English word c. Given that the author is not a perfect speaker, he has only a certain probability of realizing his intention directly and a certain probability of realizing it through some other path.

Figure 2A:
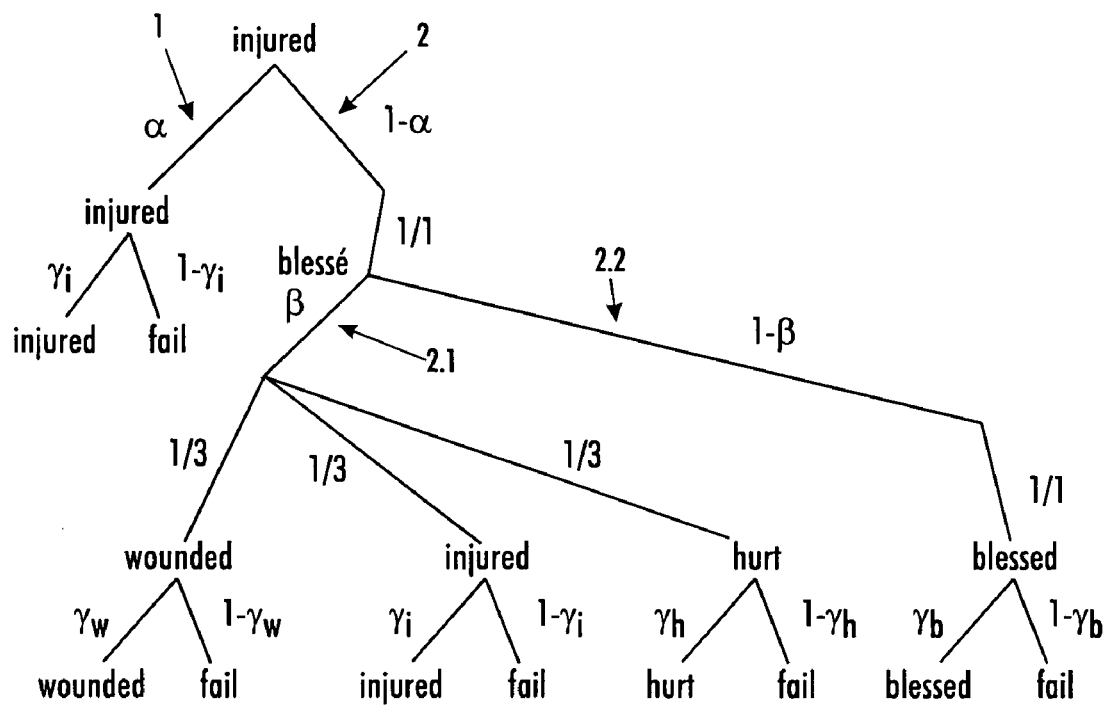
FIG. 2A illustrates the corruption process for the example where "injured" is the correct word to use in a given context.

With reference to FIG. 2A, in the following example, c="injured". The possibilities include the direct route: (1) injured→injured or the route which first translates c into f in the author's first language French: (2) injured→blessé. This either produces a second language dictionary translation of (2.1) "blessé"→"wounded" or "hurt" or "injured" or produces the false-friend translation of (2.2) "blessé"→"blessed". The probability that route (1) is taken is α, that route (2) is taken is 1-α, and that once route (2) is chosen, the probability of route (2.1) is β and route (2.2) is 1-β.

Route (2.1) is central in that it expresses the fact that in order to realize a certain intention, the author sometimes attempts to realize that intention with a first-language word which is familiar to him and then attempts to translate that word as best he can, without consideration of the exact context in which the word appears. Such a translation, e.g., "blessé"→"wounded" in the context of a car accident, is a "naïve" translation. Route (2.2) is an example of other modelable routes, particularly a "false friends" route in which the words in both the first and second languages have significant similarities of form, but have divergent meanings.

In route (2), the bilingual L1-L2 dictionary 22 is accessed. For each second language word c, a list of first language words $f_1, \ldots, f_k$ where $p(f_i|c)=1/k$ is retrieved. In order to model (2.1), the naïve translation of f into c and the L1-L2 dictionary are used.

In order to model (2.2) a "false friends" dictionary 23 is used. One could also predict other, less attested, false-friends on the basis of an algorithmic model of morphological/phonological similarity for a better covering of false-friends.

Once the distributions related to translation, dictionary look-up, and false-friends have been determined, there remain two free parameters α and β.

While this explains how to determine the probability that a certain corruption path is chosen, it has not yet accounted for an important factor: the active L2 vocabulary of the L1 native is limited. Certain L2 words are more difficult or even impossible for him to produce. In the present example, "injured" may not be salient in the active vocabulary of the writer, while "wounded" is. Because "blessé" is used in French to connote both "wounded" and "injured" without distinction, the native French speaker is apt to be familiar with only a single English word corresponding to "blessé", e.g., "wounded". At the point where the author has a potential of producing a certain r, he actually has only a certain probability $y_r$ of success and $1-y_r$ of failure. In the present process, the author tries to produce a realization c, first by choosing a certain corruption path with a certain probability. Then, at the end of this path, actually succeeds in producing the corresponding r or not. If he does not succeed at this step, he should try again until he registers a success, i.e.:

$$p(r|c) = \frac{p'(r|c)}{\sum_{r' \in V} p'(r'|c)} \qquad (3)$$

where p'(r|c) is the conditional probability of producing r given c through the described process, r ranges over V ∪ {fail}, V being the L2 vocabulary, p'(fail|c)<1, and r∈V. Thus p(r|c) is the probability of r conditional on c given that r is an actual realization.

For the parameters $y_r$, several possibilities exist. One is to use a corpus of L2 texts produced by L1 natives and then to take $y_r$ as a smooth version of the relative frequency in that corpus. Another, less attractive possibility is to take $y_r$ as the frequency of r in large corpus of texts produced by L2 writers (true L2 frequency of r). An intermediate possibility is to sharpen the histogram of true L2 frequencies in such a way that the probability of the more frequent words is increased and that of the less frequent words lowered to account for a biased knowledge of the language in which the less frequent words in L2 are less active in an L1 native than they would have been for an L2 native.

Figure 2B:
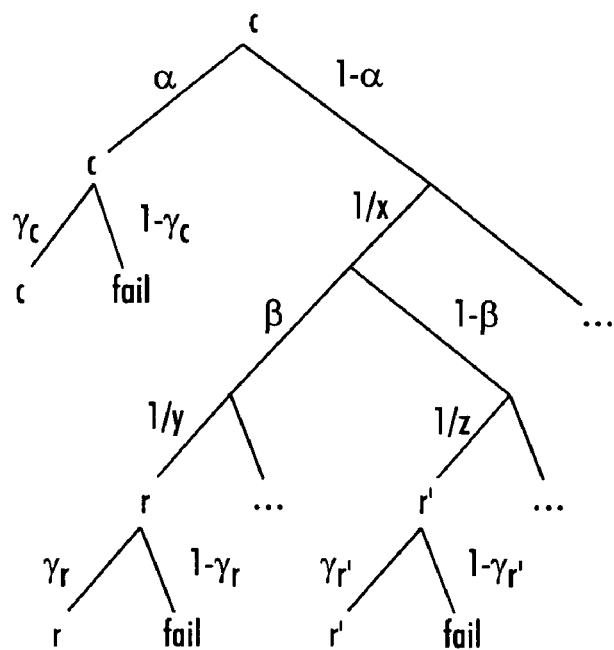
FIG. 2B illustrates a generalized summary of the corruption process.

FIG. 2B illustrates a generalized summary of the corruption process for an English word c (in language L2), where x indicates the number of French translations f (in language L1) for c, where y indicates the number of English translations r for a given f, and where z indicates the number of English false-friends r' for a given f.

FIG. 3 illustrates a formalized corruption process through a probabilistic context-free grammar which describes the rules for the generation of realizations from such intended words as c="injured", c="hurt" or c="wounded". The rules shown are an illustrative excerpt from the full grammar.

In this grammar, the non-terminals are written in lowercase and are indexed by L2 words. In order to generate a realization from the intention c, one starts with the non-terminal $s_c$ and chooses which expansion to apply according to the probability annotations. Note that the probabilities of the rules corresponding to a given non-terminal sum to 1 (normalization property) and are the conditional probabilities of applying each rule relative to the non-terminal it expands. Rule 1 (in which id stands for identity) corresponds to the direct route for producing the realization of "injured" while Rule 2 (in which efe stands for English-French-English) corresponds to the indirect route. In Rule 4 (in which fe stands for French-English), it is assumed that the dictionary contains exactly one French translation of "blessé", namely "injured". If there are several possible translations, then several such rules equally sharing a probability mass of 1 would be implemented.

Rule 3 (in which prod stands for production) illustrates that if the direct route is chosen, one still needs to actually realize the word "injured". Rules 13 and 14 (in which fet stands for a naïve French-English translation and fec stands for a French-English cognate (another name for false-friend)) correspond to the two choices for producing an English word from a French word. Rules 15, 16, and 17 illustrate the circumstance in which the dictionary contains three translations for "blessé", namely "hurt", "wounded" and "injured". Rules 19 and 20 produce the realization "hurt" with a probability of $y_{hurt}$ and otherwise fail with probability of $1-y_{hurt}$.

For all possible derivations starting from $s_{injured}$, probabilities are represented in FIG. 3. After some calculation, and using the subscripts w, i, h and b as abbreviations for wounded, injured, hurt and blessed, it will be shown that:

$$p(r = \text{wounded} | c = \text{wounded}) = \quad (4a)$$
$$\frac{0.33 \cdot (1-\alpha) \cdot \beta \cdot y_w + \alpha \cdot y_w}{0.33 \cdot (1-\alpha) \cdot \beta \cdot (y_w + y_i + y_h) + (1-\alpha) \cdot (1-\beta) \cdot y_b + \alpha \cdot y_w}$$

$$p(r = \text{wounded} | c = \text{injured}) = \quad (4b)$$
$$\frac{0.33 \cdot (1-\alpha) \cdot \beta \cdot y_w}{0.33 \cdot (1-\alpha) \cdot \beta \cdot (y_w + y_i + y_h) + (1-\alpha) \cdot (1-\beta) \cdot y_b + \alpha \cdot y_i}$$

$$p(r = \text{wounded} | c = \text{hurt}) = \quad (4c)$$
$$\frac{0.33 \cdot (1-\alpha) \cdot \beta \cdot y_w}{0.33 \cdot (1-\alpha) \cdot \beta \cdot (y_w + y_i + y_h) + (1-\alpha) \cdot (1-\beta) \cdot y_b + \alpha \cdot y_h}$$

When comparing the following two hypothesis for c:
  $c_i$=he was injured in a car accident,
  $c_w$=he was wounded in a car accident, given the realization:
  r=he was wounded in a car accident, then:

$$\frac{p(c_i|r)}{p(c_w|r)} = \frac{p(r|c_i)}{p(r|c_w)} \frac{p(c_i)}{p(c_w)} = \frac{p(r = \text{wounded}|c = \text{injured})}{p(r = \text{wounded}|c = \text{wounded})} \frac{p(c_i)}{p(c_w)} \quad (5)$$

The factor:

$$\frac{p(r = \text{wounded}|c = \text{injured})}{p(r = \text{wounded}|c = \text{wounded})} \quad (6)$$

is a measure of how much the corruption model goes along with this interpretation. In this example, the computations show:

For all values of the parameters, one has $p(r=\text{wounded}|c=\text{injured}) \leq p(r=\text{wounded}|c=\text{wounded})$, meaning that the corruption model is conservative, i.e., it prefers to stay with "wounded" if the language model is not contrary.

However, there is equality when $\alpha=0$, meaning that in this case, the corruption model is equally comfortable with "injured" as it is with "wounded". The parameter $\alpha$ can then be seen as measuring the strength of a bonus given to the conservative explanation over the correct explanation. To gain a better understanding, consider the special case of $\alpha=0.5$ and $\beta=1$ (no cognates). Then:

$$\frac{p(r = \text{wounded}|c = \text{injured})}{p(r = \text{wounded}|c = \text{wounded})} = \frac{y_w + 0.25y_i + 0.25y_h}{y_w + 4y_i + y_h} \quad (7)$$

If "wounded" is more active in the writer's vocabulary than "injured" or "hurt" (that is $y_i \leq y_w$ and $y_h \leq y_w$) then it would be seen that the ratio is at least equal to 0.25, i.e., the penalty incurred for taking "injured" in the corruption model is balanced as soon as the language model favors "injured" by at least four times over "wounded". In the case where "injured" and "hurt" are not in the active vocabulary, then the ratio is equal to 1 and there is no penalty. In fact the author, if he did mean "injured", had no other choice but to realize it as "wounded".

Continuing with the example, suppose that the replacement for "wounded" is limited to the seven hypotheses of Table I. In this instance $p(\text{wounded}|c_{killed})=0$ because "killed" cannot produce "wounded" either through the direct route or the bidirectional-translation route or the cognate route. Similarly, $p(\text{wounded}|c_{involved})=0$. "Maimed" can be translated into French as "estropié" or "mutilé", neither of which produces "wounded". This leaves as the only surviving hypotheses $c_{injured}$, $c_{hurt}$, and $c_{wounded}$ for which we need to evaluate $y_{injured}$, $y_{hurt}$, and $y_{wounded}$ and $y_{blessed}$. A rough estimate of the frequencies of the corresponding words in English given by a Google® search are given in Table II.

TABLE II

| Word | Frequency |
| --- | --- |
| "injured" | 5910000 |
| "hurt" | 9600000 |
| "wounded" | 3030000 |
| "blessed" | 4560000 | which gives $y_{injured}$ proportional to 0.59, $y_{hurt}$ proportional to 0.96, $y_{wounded}$ proportional to 0.30 and $y_{blessed}$ proportional to 0.47. For purposes of the example, we also assume that $\alpha=0.5$ and $\beta=0.9$. This gives $p(r=\text{wounded}|c_{wounded})=0.30$, $p(r=\text{wounded}|c_{injured})=0.075$, and $p(r=\text{wounded}|c_{hurt})=0.060$.

Using the results of Table I to provide estimates of the p(c) values, gives: $P(c_{wounded})$ proportional to 0.002, $p_{(cinjured)}$ proportional to 0.320, and $p(c_{hurt})$ proportional to 0.030. Finally:

$$p(c_w|r) \propto 0.43 \cdot 0.002 = 0.0009 \propto 1.0 \quad (8a)$$

$$p(c_i|r) \propto 0.075 \cdot 0.32 = 0.024 \propto 26.7 \quad (8b)$$

$$p(c_h|r) \propto 0.06 \cdot 0.03 = 0.0018 \propto 2.0 \quad (8c)$$

Thus, the probability that the writer's intention was that "He was injured in a car accident" is estimated to be 26.7 times higher than that he actually intended "wounded"!

Various other corruption models are also contemplated. For example, the values of parameters α and β can be adjusted based on a small training error-correction corpus. These parameters can also be adjusted through interactive learning as the author accepts word substitutions.

Another approach is to use maximum entropy modeling. For each pair (c, r), binary-features are introduced which tell whether there exists, in a fixed collection, a corruption path of a certain type. For instance, the feature "native-back translation" tells whether there exists in a bilingual dictionary of an L1 translation f of c such that r is a native translation of f. The "false friend" feature tells whether there exists an f such that in a fixed "false friend" list. A "synonym" feature tells whether c and r are listed as synonyms in a dictionary of synonyms. Real-valued features for measuring the accessibility of c and r to the writer (similar to y) and for measuring the log probability of c according to the language model can be provided. This leads to a log-linear model of the form:

$$p(c|r) = \frac{1}{Z_r} \exp \sum_{i=1}^{k} \lambda_i f_i(c, r) \tag{9}$$

where k is the number of features and $Z_r$ is the normalization constant:

$$Z_r = \sum_c \exp \sum_{i=1}^{k} \lambda_i f_i(c, r) \tag{10}$$

The $\lambda_i$'s are real-valued parameters which are estimated on the basis of training data.

Besides corruption paths based on bidirectional translations (e.g., injured leads to blessé which leads to wounded) or false-friends (e.g., injured leads to blessé which leads to blessed), other corruption paths can also be utilized such as synonyms, common semantic features, second language internal cognates, preposition alternatives, and first language inserts.

In one alternate embodiment that considers the generic noisy-channel model of equation (1) and the simplifying assumption of equation (2), each possible realized word r, all the possible corrections c for that word according to the corruption model, and the probabilities p(r|c) are cached in memory of computer 14 at compile time. Then, at runtime, the language model $p(c)=p(c_1 \ldots c_n)$ is combined with the corruption model, while considering for each $r_i$ the possible alternatives for $c_i$ according to the potential corrections for $r_i$.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of advising second language authors, the method comprising:
   receiving a proposed text in the author's second language with a processor;
   for at least a selected word of the second language text, with the processor determining a language model which represents a frequency of occurrence in a second language corpus and a corruption model which represents the probability that the user produced the selected word of text given that he in fact intended to use a candidate word,
   wherein the language model determining step includes determining with the processor:
      a plurality of the candidate words to be substituted for the selected word; and
      a language model probability based on the frequency of occurrence of the selected word;
   wherein the corruption model determining step includes:
      translating each of the candidate words from the second language to a first language of the author;
      determining a connecting route between the first language translations of the candidate words and the selected word, this connecting route explaining how the selected word might have been produced from the first language translations; and
      determining a probability for each candidate word based on the determined connecting route; and
   on a display device, displaying at least one of the candidate words based on the language model and the corruption model to improve the second language text.

2. The method according to claim 1 wherein the language model probability and the corruption model probability are combined by the processor and further including:
   displaying to the author a list of the candidate words in order of combined probability on the display device.

3. The method according to claim 2 further including:
   translating each of the candidate words into the author's first language (L1) with the processor; and,
   displaying the translations of the candidate words to the author on the display device.

4. A method of advising second language authors who have a first language and are writing in a second language of more appropriate or idiomatic second language word choices, the method comprising:
   receiving a proposed text by the author in the second language with a processor;
   for at least a selected second language word of the second language text, with the processor determining a language model and a corruption model, determining the corruption model including:
      translating each one of a plurality of candidate words from a second language to a first language,
      determining a connecting route between the first language translators of the candidate words and a selected word, this route explaining how the selected word might have been produced from the first language translations, and
      determining a corruption model probability for each candidate word based on the connecting route;
   based on the language model and the corruption model, with the processor determining a plurality of candidate second language words to replace the selected second language word to improve the second language text; and,
   on a display device, displaying the candidate words in the second language and translations of the candidate words c into the first language (L1) of the author to help the author choose a second language word that expresses the author's intention better than the selected second language word.

5. The method according to claim 4 wherein the language model represents a frequency of occurrence in a second language corpus.

6. The method according to claim 5 wherein the corruption model represents the probability that the user produced the selected word of the text r given that he in fact intended to use the candidate word.

7. The method according to claim 4 wherein determining the corruption model probability includes consulting a false-friend list which produces second-language cognates from first-language words.

8. The method according to claim 4 wherein determining the language model includes:
determining a plurality of candidate words for the selected word; and
determining a language model probability based on the frequency of occurrence of the selected word.

9. The method according to claim 8 further including:
determining a better word choice probability that each candidate second language word c is a better choice in the second language for the selected second language word based on the corruption model probability and the language model probability.

10. The method according to claim 9 wherein the better word choice probability is based on: (1) similarities of meaning or form with each candidate second language word and (2) frequency of usage of each candidate second language word in an analogous context.

11. A word processing apparatus comprising:
a keyboard through which an author can enter text;
a monitor which displays text;
a computer programmed with:
    a word processing program which receives keyboard entries and converts them into appropriate format for display on the monitor; and
    a language writing advisor program which is programmed to perform the method according to claim 4.

12. A word processing apparatus for advising authors who have a first language and are writing in a second language, the system comprising:
a keyboard through which an author enters text in the second language;
a monitor which displays text;
a computer programmed with:
a word processing program which converts the entered text into appropriate format for display on the monitor, and
a writing advisor program which determines second language candidate replacement words for a second language selected word of the entered text based on a determined language model and on a determined corruption model, the writing advisor program including:
a bilingual dictionary which stores translations between the first language and the second language of the author;
a language model probability routine which accesses a native second language corpus and determines a plurality of candidate second language replacement words and a frequency of occurrence of each of the candidate second language replacement words in a similar context in the native second language corpus; and, a corruption model routine which accesses the bilingual dictionary to translate each of the second language candidate words to the first language of the user and determines a connecting route between the first language translations of the candidate words and the selected word, the connecting route explaining how the selected word might have been produced from the first language translations.

13. The apparatus according to claim 12 wherein the writing advisor program further includes:
a combined probability routine for determining a combined probability based on the connecting route determined by the corruption model routine and the frequency of occurrence determined by the language model probability routine.

14. A word processing apparatus for advising authors, the system comprising:
a keyboard through which an author enters text in a second language to the author;
a monitor which displays text;
a computer which includes:
a word processing program which converts the entered second language text into appropriate format for display on the monitor, and
a writing advisor program which automatically determines second language candidate replacement words for each word of the entered text based on a determined language model and on a determined corruption model, the writing advisor program includes:
a bilingual dictionary which stores translations between a first language of the author and the second language;
a language model probability routine which accesses a native second language corpus and determines a frequency of occurrence probability of the second language candidate replacement words based on a frequency of occurrence of these words in a similar context in the native second language corpus;
a corruption probability routine which translates each second language candidate word to a first language of the user and determines a connecting route between the first language translations of the candidate words and the selected word, this connecting route explaining how the selected word might have been produced from the first language translations;
determining a corruption probability for each candidate word based on the determined connecting route;
a combined probability routine for determining a combined probability based on the probability determined by the corruption probability routine and the frequency of occurrence probability determined by the language model probability routine; and,
a routine which determines a relative probability that each candidate replacement word is a better word for expressing an intended meaning of the author than the word of the entered second language text.

15. The apparatus according to claim 14 wherein the word processor program causes each second language candidate word that has a high probability of expressing the intended meaning to be displayed on the monitor.

16. The apparatus according to claim 15 wherein the word processor program causes the monitor to display definitions in the first language of at least some of the more probable second language candidate words.

* * * * *